Sept. 14, 1965   R. HAPPE   3,205,722
SAW BAR ASSEMBLY FOR POWER DRIVEN RECIPROCATING SAWS
Filed Aug. 6, 1962
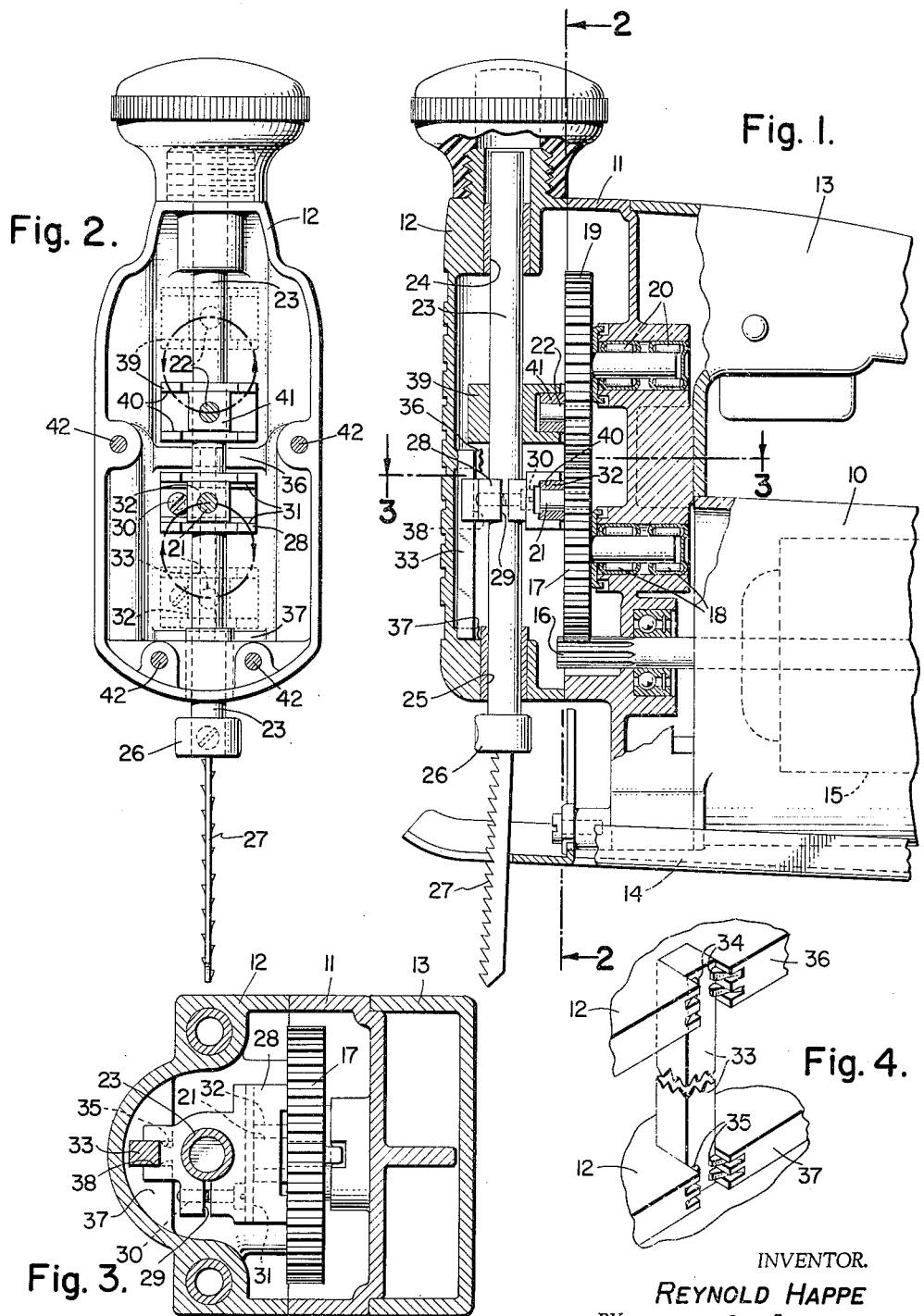
INVENTOR.
REYNOLD HAPPE
BY J. G. Stanford
ATTORNEY
WITNESS
Nicholas Leszczak

3,205,722
SAW BAR ASSEMBLY FOR POWER DRIVEN RECIPROCATING SAWS
Reynold Happe, Greenville, S.C., assignor, by mesne assignments, to The Singer Company, New York, N.Y., a corporation of New Jersey
Filed Aug. 6, 1962, Ser. No. 214,873
2 Claims. (Cl. 74—50)

This invention relates to portable power-driven reciprocating saws of the sabre saw type and more particularly to means for supporting and guiding the saw bars used in such saws.

For reasons of economy it is customary with saws of this type to use saw bars of circular cross-section carried in simple sleeve bearings for endwise reciprocatory movement. It is clear that with this construction some means must be provided to prevent uncontrolled turning of the saw bar about its longitudinal axis if controlled manual guiding of the saw is to be obtained. While many constructions for performing this function have been used they have in general been unsatisfactory in that the number and placement of the required parts yields a rather complex and difficult assembly.

It is an object of this invention, therefore, to provide means for supporting a saw bar for non-rotatable endwise reciprocatory movement which shall comprise few and simple parts in an easily assembled arrangement.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

In the drawings:

FIG. 1 is a typical longitudinal sectional view taken through a portable saw embodying the invention.

FIG. 2 is a transverse view taken substantially on the line 2—2 of FIG. 1 and shows an inside view of the front cover in elevation.

FIG. 3 is a sectional view taken substantially on line 3—3 of FIG. 1.

FIG. 4 is a detailed perspective view holding the guide bar staked to the front cover.

Referring to the drawings, the frame of the saw may comprise, in interfitted relation, a motor housing 10, a gear housing 11, a front cover 12, a handle 13 and a base plate 14. An electric motor 15 secured in housing 10 has its shaft pinion 16 projecting into the gear housing 11 to mesh with a lower gear 17 journaled in needle bearings 18.

An upper gear 19, identical to and meshing with the lower gear 17, is journaled in needle bearings 20. The gears 17 and 19 have eccentric pins 21 and 22, respectively, and the gears 17 and 19 are so meshed as to drive the pins 21 and 22 in circular paths of opposite rotation and phase as indicated by the arrows in FIG. 2.

A saw bar 23 of circular cross section is supported for endwise movement in sleeve bearings 24 and 25 secured within the cover 12. A chuck 26 provides means for detachably securing a saw blade 27 to the saw bar 23.

A lower crosshead 28, having a split portion 29, embraces the saw bar 23 and is clamped thereto by means of screw 30 as seen best in FIG. 3. The crosshead 28 is formed with a milled transverse slot 31 for receiving a slide block 32 which freely embraces the eccentric pin 21.

A single vertically positioned guide bar 33 is secured in parallel relation to the longitudinal axis of the saw bar 23 to the cover 12 preferably by staking as at 34 and 35 to respective boss portions 36 and 37 as seen best in detail in FIG. 4. The crosshead 28 is formed at its forward end with an open slot 38 to receive the guide bar 33 in fitted sliding engagement. It will be seen that this engagement prevents undesirable turning of the saw bar 23 about its longitudinal axis and permits the saw blade to be guided by manipulation of the saw frame to follow any desired contour to be cut.

An upper crosshead 39 slidably fitted on the saw bar 23 is formed with a milled slot 40 for receiving a slide block 41 which freely embraces the eccentric pin 22. This crosshead 39 is designed with a mass such as to balance the otherwise unbalanced reciprocating masses of the saw bar 23, crosshead 28, chuck 26, and blade 27, thus preventing the generation of vibratory forces which would thus otherwise undesirably be transmitted to the hand of the operator.

From the above description it will be clear that there is provided according to this invention a simple assembly in which a saw bar 23 is fully contained as an operating unit within a removable cover 12 and may be inspected for lubrication and proper operation before attaching to the gear housing 11 by means of screws 42 as seen best in FIG. 2. The use of the single guide bar 33 simply secured to the cover also provides a ready means for obtaining proper prealignment of the crosshead 28 with respect to the face of the gear 17 so that in the final assembly no scoring of the gear face will occur.

Having thus set forth the nature of this invention, what is claimed herein is:

1. A saw bar assembly for a power driven reciprocating saw having a gear housing, comprising a removable cover for said housing, a saw bar having a circular cross-section, spaced bearings secured in said cover for slidably supporting said saw bar for endwise reciprocatory motion along its longitudinal axis, a crosshead adjustably secured to said saw bar, spaced bosses formed on the interior of said cover and extending transversely of said saw bar axis, vertically-aligned open slots formed in said bosses and a single stationary guide bar secured in said open slots to stand parallel to said saw bar axis, said crosshead being formed with an engaging portion to receive said guide bar in slidable guiding engagement therewith to prevent turning of said saw bar about its longitudinal axis with respect to said bearings.

2. A saw bar assembly for a power driven reciprocating saw having a driving gear with an eccentric pin and a housing for said gear, comprising a removable cover for said housing, a saw bar having a circular cross section, spaced bearings secured in said cover for slidably supporting said saw bar for endwise reciprocations along its longitudinal axis, a crosshead adjutably secured to said saw bar, spaced bosses formed on the interior of said cover and extending transversely of said saw bar axis, vertically-aligned open slots formed in said bosses, and a single stationary guide bar secured in said open slots to stand parallel to said saw bar axis, said crosshead being formed on one side with a first open slot for driving engagement with said eccentric pin and on the opposite side with a second open slot positioned transversely to said first slot for guiding engagement with said guide bar whereby said crosshead is maintained in non-interfering relation with respect to the driving gear.

References Cited by the Examiner
UNITED STATES PATENTS

| | | | |
|---|---|---|---|
| 1,951,170 | 3/34 | Schwob | 74—50 |
| 2,639,737 | 5/53 | Forsberg | 74—50 X |

FOREIGN PATENTS 280,797    11/12    Germany.

BROUGHTON G. DURHAM, *Primary Examiner.*